United States Patent [19]

Castor

[11] Patent Number: 4,813,275
[45] Date of Patent: Mar. 21, 1989

[54] LEAK DETECTION METHOD AND DEVICE
[75] Inventor: Trevor P. Castor, Cambridge, Mass.
[73] Assignee: ENG, Inc., Arlington, Mass.
[21] Appl. No.: 115,361
[22] Filed: Nov. 2, 1987
[51] Int. Cl.[4] .......................... G01M 3/00; G01F 23/22
[52] U.S. Cl. ........................................ 73/49.2; 73/309
[58] Field of Search ............ 73/49.2, 309, 296, 862.65

[56] References Cited

U.S. PATENT DOCUMENTS

| | | | |
|---|---|---|---|
| 3,795,140 | 3/1974 | Nishihara | 73/309 X |
| 4,181,012 | 1/1980 | Kiuchi | 73/862.65 |
| 4,646,560 | 3/1987 | Maresca, Jr. et al. | 73/49.2 |

FOREIGN PATENT DOCUMENTS

| | | | |
|---|---|---|---|
| 1918281 | 11/1969 | Fed. Rep. of Germany | 73/309 |
| 3432199 | 3/1986 | Fed. Rep. of Germany | 73/296 |
| 1019561 | 10/1952 | France | 73/309 |

*Primary Examiner*—Stewart J. Levy
*Assistant Examiner*—Joseph W. Roskos
*Attorney, Agent, or Firm*—Wolf, Greenfield & Sacks

[57] ABSTRACT

A device for measuring leaks by measuring buoyancy force changes on a mechanical force transducer inserted into a liquid in the storage tank. The buoyancy force changes result in liquid level changes inside the tank which in turn cause moment forces acting on the mechanical force transducer. These moment forces cause strain changes in the mechanical force transducer. These strain changes are measured by a strain gage attached to the mechanical force transducer.

5 Claims, 2 Drawing Sheets

LEAK DETECTION METHOD AND DEVICE

This invention relates to a method and an apparatus for detecting and measuring fluid leaks from fluid storage tanks.

BACKGROUND OF THE INVENTION

Leaks of hazardous substances from storage tanks pose a substantial threat to the environment in various areas throughout the world. It is estimated that there are approximately 1.4 million underground storage tanks in the United States alone that contain commercial quantities of petroleum or other hazardous substances. An estimated 100,000 of these tanks are presently leaking and another 350,000 are expected to leak within the next five years. New York estimates that 19% of its 83,000 active underground gasoline tanks are now leaking. Maine estimates that 25% of its 1,600 retail gasoline underground storage tanks leak approximately eleven million gallons per year.

The corrective costs associated with such leaking tanks are staggering. The gasoline leakage from one tank may require an expenditure of up to ten million dollars for a proper clean up. For example, leakage from an underground gasoline tank on Cape Cod has infiltrated the underground aquifer in the area and three million dollars already has been spent in unfinished corrective actions.

The existing methods of leak detection exhibit various drawbacks, including extremely long testing periods, inability to differentiate between piping and tank leaks, failure to account for vapor pockets, and failure to compensate for water table influences. Additionally, many of the existing tests are not sensitive enough and do not yield reliable results. For example, The National Fire Protection Association (NFPA) codes require tank replacement or corrective action for leak rates greater than 0.05 gallons per hour. Thus, an adequate leak testing method must be sensitive enough to measure leaks of 0.05 gallons per hour or less. Existing leak detection devices have not been able to meet this requirement with a high degree of reliability. Whereas most states have adopted the NFPA regulations, the Environmental Protection Agency may require that all commercial underground storage tanks have a leak rate less than 0.1 gal/hr. with a 99.9% reliability factor.

The current invention involves an electromechanical leak detection device which detects minute volumetric changes in fluid levels in storage tanks or their associated piping systems. The invention detects and measures leaks by measuring buoyancy force changes on a mechanical force transducer inserted into the liquid in a storage tank. The buoyancy force changes result from liquid level changes inside the tank which in turn cause moment forces acting on the mechanical force transducer. These moment forces cause strain changes in the mechanical force transducer. These strain changes are measured by a strain gage attached to the mechanical force transducer.

The invention is very sensitive being capable of detecting volume changes as little as 0.005 gallons per hour. The invention requires short testing time and is inexpensive both as an instrument and in practicing the method contemplated by the invention. The device of the invention is easily tared and calibrated and can distinguish between fill pipe leaks and tank leaks. A preferred embodiment of the invention is an automated device requiring minimal operator input.

Applicant's device for detecting and measuring leaks into or out of fluid storage tanks includes a support member, a mechanical force transducer and an electronic strain detection device. The free end of the mechanical force transducer terminates in a fluid force sensor. The other end of the mechanical force transducer is rigidly attached to the support member. The mechanical force transducer defines first and second segments substantially at right angles to one another. The second segment is capable of micro elongation and contraction when a force is applied axially to the first segment. Preferably the mechanical force transducer is constructed entirely of aluminum. The first segment is a rod rigidly attached to and extending at about a 90° angle from the second segment, a cantilever beam capable of micro strain elongation and contraction when a force is applied axially to the rod. Preferably the strain detection device is a strain gage attached to the upwardly facing surface of the cantilevered beam close to its point of rigid attachment to the support member. The strain gage is attached to a strain gage meter.

In operation, the terminal end of the rigid force transducer is introduced into the fluid in a storage tank. The support member is maintained in fixed position. This maintains the force transducer with the terminal end submersed essentially in fixed position. The change in the force exerted by the fluid on the submerged end due to changes in fluid level results in micro elongations or contractions in regions of the mechanical force transducer. These elongations or contractions may be related to volumetric changes in the storage tank resulting from leaks out of or into the tank by calibrating units of micro strain elongation relative to known changes in the volume of fluid in the tank.

DETAILED DESCRIPTION OF THE DRAWINGS

Figure 1:
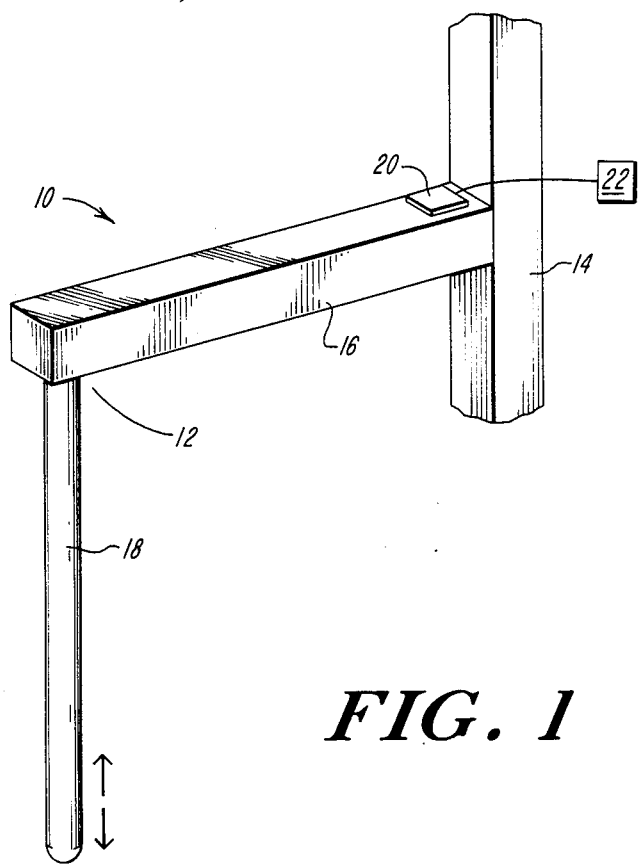
FIG. 1 is a schematic drawing of applicant's apparatus according to the invention.

Referring now to FIG. 1, applicant's leak detection apparatus 10 includes a mechanical force transducer 12 rigidly attached to a support member 14. The mechanical force transducer 12 preferably is constructed entirely of aluminum, although many other materials including aluminum alloys, may be used. It consists of a cantilever beam 16 connected at one end to a rod 18, the rod 18 extending substantially perpendicular to the cantilever beam 16. The other end of the cantilever beam is rigidly attached to the support member 14. A strain gage 20 or a configuration of strain gages, generically referred to as "strain gage" herein, is attached to the upwardly facing surface of the aluminum cantilever beam 16 at a region close to the support member 14. The strain gage in turn is connected to a multi-terminal strain gage meter 22.

A force (arrows) applied axially to the rod 18 will cause micro strain elongation or contraction in the cantilever beam 16. The micro strain elongation or contraction is detected by the strain gage 20 and electronically transduced into readable units of strain by the strain gage meter 22.

Figure 2:
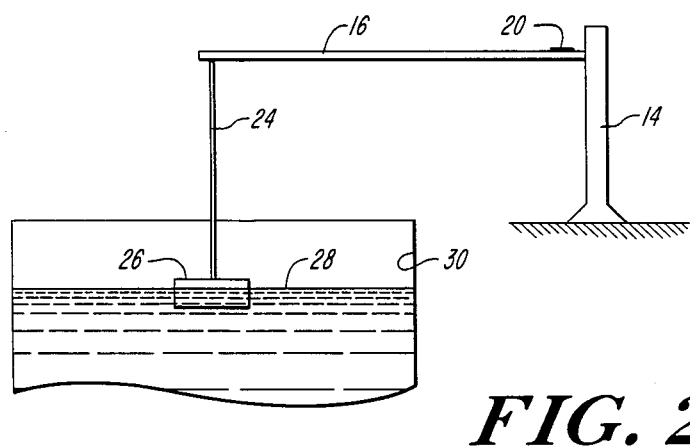
FIG. 2 is a schematic drawing of a preferred embodiment of applicant's device according to the invention.

FIG. 2 shows a preferred embodiment of the invention. As in FIG. 1, the cantilever beam 16 of the mechanical force transducer 12 is rectangular in cross section. Preferably, the dimensions are less than about 1" wide by 1/16" thick. The rod has a narrow spindle portion 24 and a wider sensor portion 26 for contacting the fluid 28 in the fill pipe 30 of a storage tank. Narrowing the spindle portion 24 reduces the weight of the rod 18 acting on the cantilever beam 16. Enlarging the sensor portion 26 increases the change in the force acting upon the mechanical force transducer 12 for a given fluid level change. Most preferably the dimensions of the spindle portion 24 are 1" or less in diameter and 12" to 96" in length. Length will vary depending on whether the measurement is to be taken close to the surface in the fill pipe or deeper in the tank. The dimensions of applicant's sensor portion 26 are about 2" in diameter by 4" or less in thickness. The sensor portion may be hollow on the inside in order to decrease the bulk density, and to increase instrument sensitivity and reliability.

In operation, the sensor portion 26 is introduced into the fill pipe 30 of a storage tank until the sensor portion 26 is partially submerged in the fluid 28, preferably submerged 4" to 8". As the liquid level inside the tank drops due to leaking, the buoyancy force acting on the sensor changes. This in turn changes the moment forces acting on the cantilever beam 16 through the spindle 24. These moment forces cause strain elongation or contraction in the cantilever beam 16 which strain changes are detected by a strain gage 20 fixed to the cantilever beam 16. Preferably the strain gage is positioned on the cantilever beam 16 close to the heavy fixed support member 14. A strain gage meter 22 attached to the strain gage 20 transduces the mechanical strain detection into an electronic output signal which may be read in units of strain by the operator. The units may be calibrated by adding known volumes of fluid to the tank and measuring changes in units of strain. While the illustration depicts a measurement taken when the fluid level is within the fill pipe, it should be understood that the measurement may be taken when the fluid level is below the level of the fill pipe.

Testing time can be reduced, and the effects of non-controllable variables—such as temperature and evaporation—can be reduced by increasing digital strain sensitivity by using various strain gage configurations such as equiangular and rectangular rosettes. The invention also contemplates the use of temperature probes, atmospheric pressure gages and the like to further control for variations in the ambient conditions. For example, gasoline has an expansion coefficient of 0.00068 gal/gal/°F. An increase in temperature of 0.01° Fahrenheit per hour in a 10,000 gallon tank will cause an increase in volume of 0.068 gallons, thereby possibly offsetting an observed leak rate. To compensate for temperature, temperature probes may be introduced throughout the fluid in the tank to carefully monitor any changes in temperature in the tank. The change in volume due to temperature may be determined and the change in fluid level due to temperature may be determined from the temperature related change in volume. Finally, the units of micro strain elongation due to temperature related volume changes may be determined. These "control" units of micro strain elongation then are subtracted from the measured test units of micro strain elongation to control for temperature. The temperature probes, along with the strain gage meter, may be attached to microprocessing equipment which can make the desired calculations in controlling for temperature.

Figure 3:
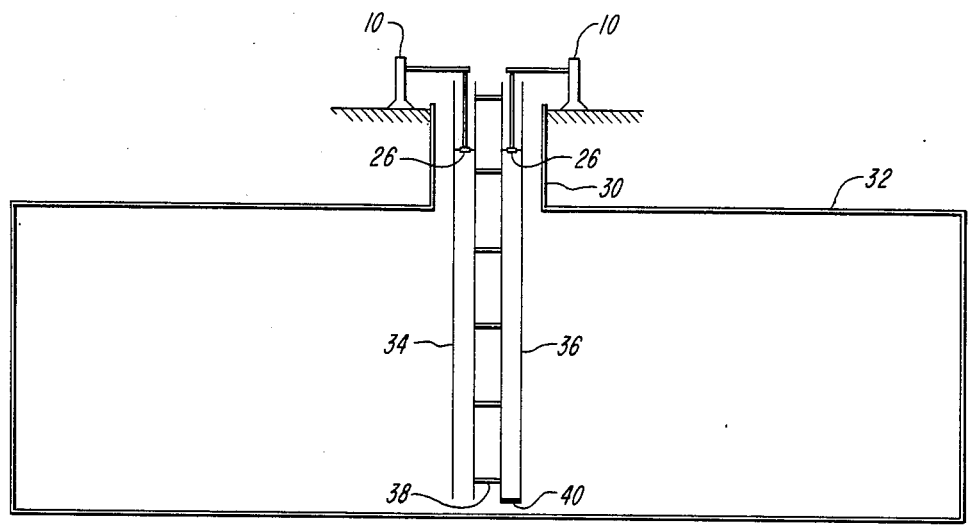
FIG. 3 is a schematic drawing of applicant's leak detecting device partially immersed in the fill pipe of a storage tank according to a preferred method of operation.

According to another embodiment of the invention, control tube mechanisms are provided to compensate for temperature, evaporation and other uncontrollable variables which can affect the performance of applicant's device under real world conditions. Referring to FIG. 3, a first tube 34 and a second tube 36 of matching dimensions and connected by bars 38 first are introduced into the storage tank 32 through the fill pipe 30. The tubes are of a length such that they run to just above the bottom of the tank at one end and extend above the fluid level at the other end. The two tubes originally are open at each end to ensure that the fluid level equilibrates to the same height in each tube. A spring-loaded cover or cap 40 then is tripped to close the bottom of the second tube 36 which will act as a control tube. The mechanism for closing the cap should be such that the operation is smooth and non-disturbing. Matching leak detection devices, as described and illustrated in FIG. 2, then are placed such that the sensor portion 26 of each device extends into the open top of a tube and is submersed within the fluid in the tube. Then, strain elongation or contraction is measured for each leak detection device over time.

If the temperature increases or decreases in the tank during a test, the fluid level in each tube will raise or lower itself accordingly. Likewise, evaporation will occur at the same rate from the control tube as from the open tube. During a leak test, any strain changes due to these two effects and possibly others are cancelled by subtracting the strain reading taken from the control force transducer in the control tube from the reading taken from the test force transducer in the testing tube which is subject to fluid level changes from tank or piping leaks. In laboratory tests using a 1/32" thick rectangular aluminum cantilever beam, a 0.027 gallon per hour fluid loss was detected in a 4" diameter vessel, which is a typical diameter for the fill pipe of an underground petroleum fuel storage tank.

It should be understood that various changes and modifications to the embodiments above described are contemplated within the scope of this invention. For example, while aluminum is described as a preferred material, other materials are possible. Aluminum alloys and other materials which have a maximum allowable yield stress in excess of 10,000 psi may be used. Other materials include those which increase the flexural strength of the force transducer while increasing the strain sensitivity, e.g., silicon or polymer construction materials such as structural grade silicon glass fabric laminate, polycarbonate resins, and/or composites of carbon fibres and high strength thermoplastic resins. As a guide to selecting materials that are possible according to the invention, the sensitivity of existing strain detection instrumentation should be considered. The strain that is initially put upon the point at which the strain gage is applied to the cantilever beam is given by the formula of:

$\epsilon = Mc/EI$ where:
 $\epsilon$ = strain, in/in
 M = moment acting [at point 20], in-lb
 c = distance from minimum to maximum strain in E = Young's Modulus of elasticity, psi
I = Moment of Inertia of beam cross-section, in$^4$ The moment of inertia of the beam cross-section at point 20, is given by:

$$I = bh^3/12$$

where:
b = beam x-section width, in
h = beam x-section height, in

The moment forces, M, that influence the strain are the forces sum of the moments at the point of attachment of the strain gage 20. These include the weight of cantilever beam 16 and rod 18 multiplied by their respective moment arms, and the buoyancy forces from the liquid acting in the opposite direction multiplied by its moment arm as shown in FIG. 1. The moment contribution from cantilever beam 16 is the weight of cantilever beam 16 multiplied by ⅔ the distance from the support member 14. The moment contribution from rod 18 is the weight of rod 18 multiplied by the distance from its center of gravity to the strain gage.

After a unit time interval, a leak will cause the following change in strain at point of attachment of the strain gage:

$$d\epsilon = -dMc/EI, \text{ in}^4$$

where:
dM = change in moment acting at strain gage, in-lb
This change in moment dM, is given by:
dM = ldB, in-lb
where:
  dB = change in buoyancy by leak, lb
  dB = $\pi r^2 \rho$
  l = length of cantilever beam, in
where:
  $\pi$ = 3.1421
  r = radius of aluminum sensor, in.
  h = fluid level loss in fill pipe, in
  $\rho$ = density of product, lb/in$^3$ After one hour of leaking at a rate of 0.05 gal/hr., this change in strain has been calculated to be 10 microinches per inch for applicant's rectangular cantilever beam (12"×1×0.125") and cylindrical spindle/sensor combination (1" OD×24" long). This reading is well within the bounds of strain detection instrumentation of off-the-shelf equipment specifically designed for this level of accuracy. (less than 0.1 micro-inch/inch). The sensitivity of the instrument can be increased by decreasing the thickness of the cantilever beam. Sensitivity also may be increased if the beam width is reduced or length is increased. For example, if there is a minute leak in the tank and the fluid level decreases by 0.01 inches (this is equivalent to a 0.0002 gallon loss in a 4" fill pipe) the strain reading will change by 20 microinches using a 1/32" beam or by 76 microinches using a 1/64" beam.

It is intended that all matter contained in the above description or shown in the accompanying drawings shall be interpreted in an illustrative and not limiting sense.

What is claimed is:

1. An apparatus for detecting and measuring leaks in underground storage tanks comprising,
   a rigid support means capable of being maintained in a fixed position,
   a substantially rigid mechanical force transducer means having two ends, one of said ends rigidly connected to said support means and the other of said ends adapted to contact a fluid and act as a fluid force sensor, said force transducer means constructed and arranged such that once said fluid-contacting end is introduced into a fluid, the rigidly-connected end will respond in micro strain elongation and contraction resulting from fluid level changes, and
   strain detection and measurement means capable of detecting and measuring the micro strain elongation and contraction in said force transducer when a change in force resulting from a fluid level change is applied to said free end.

2. An apparatus as claimed in claim 1 wherein said mechanical force transducer comprises first and second segments substantially at right angles to one another, the first of said segments terminating in said fluid force sensor, the second of said segments rigidly attached to said support member, said rigidly attached second segment capable of micro elongation and contraction when a force is applied axially to said first segment.

3. A method for detecting and measuring fluid leaks into or out of fluid storage tanks and pipes using a force transducer having a free end and an opposite end, said opposite end rigidly attached to a rigid support member and said free end adapted to contact a fluid and act as a fluid force sensor, said mechanical force transducer constructed and arranged such that once said fluid-contacting end is introduced into a fluid, the rigidly-connected end will respond in micro strain elongation and contraction when a change in force resulting from a fluid level change is applied to said free end comprising,
   introducing the free end of said force transducer into said fluid,
   maintaining said support member in fixed position, and
   measuring the micro strain elongation in an area along said force transducer over time.

4. A method as claimed in claim 3 further comprising calibrating the units of micro strain elongation relative to known changes in the volume of fluid in the tank, measuring the units of micro strain elongation over time, and determining the rate of change of volume of fluid in the tank.

5. A method as claimed in claim 4 wherein temperature and evaporation are controlled for by the further steps of,
   introducing a first tube into said fluid, one end of said tube extending above the level of the fluid and opposite end extending nearly to the bottom of the tank,
   introducing the free end of the force transducer, a test transducer, into the fluid within the first cylinder, and,
   introducing a second tube into the fluid in a manner as described with respect to the first tube, closing off the bottom of said second tube after it has been introduced, introducing the free end of a control force transducer into the fluid within the second tube and measuring the units of micro strain elongation in an area along the control force transducer over time,
   subtracting the units of strain elongated in the control force transducer from the units of strain elongation in the test force transducer, and determining the rate of change of volume of fluid in the tank.

* * * * *